Jan. 6, 1970 P. A. WEBSTER ET AL 3,488,596

BATTERY OPERATED RADIO RECEIVER

Filed March 7, 1966

Inventor
PETER A. WEBSTER
DENNIS A. CLARE
JOHN R. BRINKLEY
By
Browne, Schuyler & Beveridge
Attorney United States Patent Office 3,488,596
Patented Jan. 6, 1970

3,488,596

BATTERY OPERATED RADIO RECEIVER

Peter A. Webster, Dennis A. Clare, and John Raymond Brinkley, Cambridge, England, assignors to Pye Limited, Cambridge, England, a British company Filed Mar. 7, 1966, Ser. No. 532,303
Claims priority, application Great Britain, Mar. 9, 1965, 9,850/65
Int. Cl. H04b *1/06*
U.S. Cl. 325—492 1 Claim

ABSTRACT OF THE DISCLOSURE

This invention relates to a battery operated transistor radio receiver incorporating a battery economizer arrangement for reducing the power consumption from the battery in the absence of a received signal. The invention provides means whereby the economizer arrangement only becomes effective at a time after cessation of an incoming signal so that the receiver will not be turned off by a momentary interruption of a received signal.

This invention relates to apparatus for obtaining reduced power consumption from the direct-current supply for a radio set in the absence of a signal.

Hitherto such battery economizer systems have usually obtained reduction of consumption by circuits controlling the direct current fed to one part only of a receiving set in proportion to the strength of a received signal, the receiver therefore operating at reduced consumption in the absence of a signal.

A feature of the invention is a means for obtaining reduced power consumption from the direct current supply to a radio receiver in the absence of a signal in which, by interrupting means the direct current path in the receiver is periodically made alternately conductive and non-conductive (which latter term includes the bringing of the said current to substantially zero magnitude) the said interrupting means being disabled to hold the said path in a conductive state on the advent of an incoming signal to which the receiver is adapted to respond.

A further feature of the invention is a radio receiver embodying the said means for obtaining reduced power consumption.

In receiving sets employing valves it is only practical, due to the thermal inertia of the valve heaters, to make economies in the amount of HT current taken by the set, but in sets employing transistors any such economy that can be made is a higher percentage of the total power that would otherwise be consumed and the invention is therefore particularly applicable to such transistor sets.

The above and other features of the invention will be more readily understood by a perusal of the following description of one embodiment of the invention having reference to the accompanying drawings in which like parts have the same reference and in which.

Figure 1:
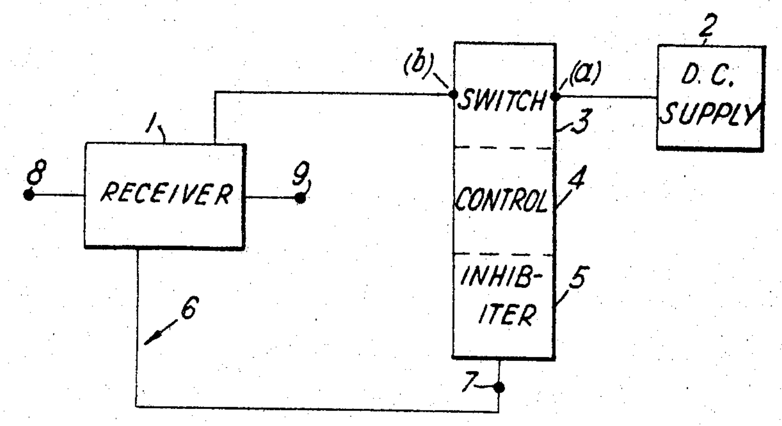
FIGURE 1 is a block diagram showing the connections between a direct current power supply, battery economizer and radio receiver.

Referring to FIGURE 1 a radio receiver 1 is connected to a direct current power supply 2 such as primary or secondary cells through connections *a* and *b* of an electronic switch 3 operated by a periodic switch control 4, the said control causing the electronic switch 3 to open and close repeatedly, the period of closure with the switch conductive and the receiver 1 capable of reception being shorter than the period of non-conduction. The switch control 4 is in turn controlled by an inhibitor 5 which when energised by a disabling voltage 6 applied to the terminal 7 prevents operation of the periodic switch control 4 and locks the electronic switch 3 in the closed position with the receiver 1 energised. The disabling voltage 6 is derived, via the receiver 1 during a conduction period of the switch 3, from the signal applied to the receiver input terminal 8, the receiver output being taken from terminal 9.

For the above system to work successfully and give a large economy in power consumption certain conditions must be met, viz:

(a) ELECTRONIC SWITCH AND SWITCH CONTROL

The non-conductive period must not be of sufficient duration to cause loss of information from the input signal to the receiver. The conductive period must be of substantially shorter duration than the non-conductive period. The current taken by the switch control must be small relative to the receiver current. The frequency of switching must be such that the switching produces no audible output from the receiver.

(b) RECEIVER

Time constants therein must be such that a disabling voltage is available within the duration of a conduction period of the electronic switch and direct current ceases to flow in the receiver when the switch is non-conductive.

(c) INHIBITOR

This must have rapid action on the application of a disabling voltage to prevent the occurrence of the following period of non-conduction. It must also have a less rapid response to the cessation of a disabling signal and thus prevent interruption of current to the receiver during a momentary interruption of the input signal.

Figure 2:
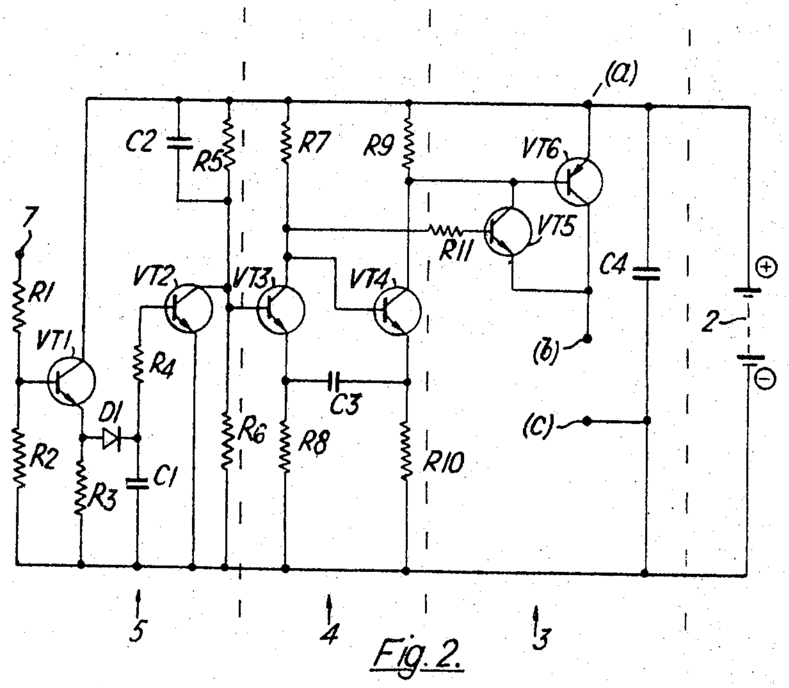
FIGURE 2 is a circuit diagram of a battery economizer.

Referring to FIGURE 2, VT3 and VT4 having collector resistors R7 and R9 respectively and having the base of VT3 biased by the potentiometer formed by resistors R5 and R6 comprise the periodic switch control 4 and function as a free running multivibrator with a frequency and mark/space ratio controlled by capacitor C3 mainly in conjunction with resistors R8 and R10 in in the respective emitters of VT3 and VT4, e.g. 2 cycles per second and 1/5 respectively. VT5 and VT6 comprise the electronic switch 3, the operation of control and switch being as follows.

With VT4 conducting (mark), VT3 is cut off, VT5 base is held at almost full positive voltage and VT5 and VT6 are turned on to allow current from the connection *a* of the battery 2 to flow to the receiver connected between terminals *b* and *c*, the majority of the base current for VT6 being supplied through R10 via VT4 and that for VT5 through resistors R7 and R11. When the multivibrator changes over (space) VT3 is conducting and VT4 is cut off, so turning off VT5 and VT6 and interrupting the supply of current from the battery to the receiver.

The action is repetitive and will continue until a positive going disabling signal is applied to the input terminal 7 of the inhibitor 5, comprised of VT1 and VT2, when the base and emitter of VT1 will be carried positive, rapidly charging capacitor C1 through diode D1, transistor VT1 having a load resistor R3 in its emitter circuit and acting as an emitter follower. The base of VT2 therefore moves in a positive direction and when VT2 conducts, VT3 is cut off by the increased current flow in resistor R5 in the collector of VT2, the multivibrator action ceases and the electronic switch 4 formed by VT5 and VT6 is held in the conducting condition. When the disabling signal is removed the diode D1 presents a high resistance path and capacitor C1 discharges through resistor R4 and the base-emitter junction of VT2 and eventually the multivibrator starts working again. The fast charge and slow discharge of capacitor C1 ensures that the switch will lock on to a received signal rapidly and that the receiver will not be turned off by a momentary interruption of the signal applied to terminal 7.

The disabling signal may be derived from any suitable point in the receiver and, in the particular application described, the D.C. voltage change at the collector of a transistor used as a squelch gate is utilised, resistors R1 and R2 forming a potential divider to apply a proportion of the change to the base of transistor VT1.

The purpose of capacitor C2 is to overcome interaction between the economizer and receiver since when the receiver is switched on by the electronic switch 3 the resulting sudden flow of current causes a fall in voltage at the battery terminals. This negative pulse could trigger the multivibrator into its next half cycle and so open the electronic switch 3 earlier than desired. The connection of capacitor C2 ensures that VT3 remains cut off during the transient, so retaining the required frequency and mark/space ratio from the multivibrator.

Although the embodiment of the invention described above uses a majority of NPN transistors and particular polarities of battery and disabling voltage, it may readily be adapted to cater for other uses and for other types of transistors and voltage. For example the disabling voltage may be of zero frequency obtained from the modulation of an incoming carrier by either information or pilot tone, the switch thus being locked in the conducting condition only when an incoming carrier wave is modulated, or it may be an alternating voltage with the voltage applied to the base of transistor VT2 being obtained from rectification by components in the inhibitor 5 preceding this transistor.

Where the disabling voltage is derived from a pilot frequency, selective control of receivers from a transmitter is available.

We claim:

1. A battery operated transistor radio receiver having a battery economizer arrangement for reducing the power consumption from the battery in the absence of a signal comprising a transistor switch connected between the battery and the receiver, a transistor relaxation oscillator for operating the transistor switch periodically to make and break the battery circuit at a sub-audible frequency with the "make" time substantially less than the "break" time, and bias means operable by an incoming signal for biasing the oscillator to a non-operative condition so as to lock the transistor switch in the "make" state whilst the receiver is subject to an incoming signal to which the receiver is adapted to respond and which maintains said transistor switch in the "make" state for a period after cessation of the incoming signal, said bias means comprising a capacitor connected to a signal path from the receiver through a first transistor and a rectifier, and a second transistor controlled by said capacitor, when charged, to bias said relaxation oscillator to a non-operative condition, whereby an incoming signal rapidly charges said capacitor through said first transistor and said rectifier, said rectifier presenting a high resistance path to the discharge of the capacitor on the cessation of the signal, said capacitor then discharging through a path including said second transistor.

References Cited

UNITED STATES PATENTS

| | | | |
|---|---|---|---|
| 2,884,518 | 4/1959 | O'Neill | 325—492 |
| 2,912,574 | 11/1959 | Gensel | 325—492 |
| 2,957,074 | 10/1960 | Trevor | 325—410 |
| 3,154,740 | 10/1964 | Eness | 325—410 |
| 3,328,724 | 6/1967 | Way | 307—247 |

KATHLEEN H. CLAFFY, Primary Examiner

C. W. JIRAUCH, Assistant Examiner